US010132439B2

(12) United States Patent
Andersson et al.

(10) Patent No.: US 10,132,439 B2
(45) Date of Patent: Nov. 20, 2018

(54) PIPE AND A METHOD FOR REDUCING BIOFILMS

(75) Inventors: Thomas Andersson, Kungsör (SE); Johan Abrahamsson, Kungsör (SE)

(73) Assignee: EPFF ELECTRICAL PIPE FOR FLUID TRANSORT AB, Kungsor (SE)

( * ) Notice: Subject to any disclaimer, the term of this patent is extended or adjusted under 35 U.S.C. 154(b) by 1356 days.

(21) Appl. No.: 13/140,434

(22) PCT Filed: Dec. 18, 2009

(86) PCT No.: PCT/SE2009/051452
§ 371 (c)(1),
(2), (4) Date: Jul. 8, 2011

(87) PCT Pub. No.: WO2010/071588
PCT Pub. Date: Jun. 24, 2010

(65) Prior Publication Data
US 2011/0259833 A1 Oct. 27, 2011

(30) Foreign Application Priority Data
Dec. 19, 2008 (SE) ........................ 0850161

(51) Int. Cl.
C02F 1/48 (2006.01)
F16L 55/24 (2006.01)
F16L 58/00 (2006.01)

(52) U.S. Cl.
CPC ............... F16L 55/24 (2013.01); F16L 58/00 (2013.01); F16L 2201/40 (2013.01)

(58) Field of Classification Search
CPC ....................... C02F 1/46; C02F 1/4608; C02F 2001/46109; C02F 2001/46133; C02F 2201/4313; C02F 2201/46125; C02F 2201/4613; C02F 2201/46135; C02F 2303/20; F16L 2201/40; F16L 55/24; F16L 58/18
USPC ........................ 138/118; 204/554, 660, 672; 210/748.01; 422/22
See application file for complete search history.

(56) References Cited

U.S. PATENT DOCUMENTS 4,872,959 A * 10/1989 Herbst et al. ................. 205/566
5,234,555 A * 8/1993 Ibbott .............................. 422/22
5,756,051 A * 5/1998 Overton et al. .............. 422/108
6,394,502 B1 * 5/2002 Andersson .................... 285/21.2
(Continued)

FOREIGN PATENT DOCUMENTS

DE     203 18 963 U1     6/2004
GB         471318     *  9/1937 ................ C02F 1/48
GB     2 196 954 A       5/1988
(Continued)

OTHER PUBLICATIONS

PVC.org Website (accessed Dec. 15, 2014), 1 page.*
(Continued)

Primary Examiner — Patrick J Orme
(74) Attorney, Agent, or Firm — Myers Bigel, P.A.

(57) ABSTRACT

The present invention relates to a pipe comprising first and second parts of electrically conducting material. The parts are electrically insulated from each other and are arranged on the inside surface of the pipe, extending substantially in the longitudinal direction of the pipe.

18 Claims, 1 Drawing Sheet

(56) References Cited

U.S. PATENT DOCUMENTS

2004/0112840 A1  6/2004  Bourazak et al.
2004/0238453 A1  12/2004  Cho

FOREIGN PATENT DOCUMENTS

| GB | 2 384 536 A | 7/2003 | | |
|---|---|---|---|---|
| GB | 2 432 588 A | 5/2007 | | |
| JP | 11-114570 A | 4/1999 | | |
| JP | 11-114570 | * 11/1999 | ................ | C02F 1/46 |
| JP | 2005-74256 | 3/2005 | | |

OTHER PUBLICATIONS

Katayama, Japanese Publication No. 11-114570A, U.S. Patent and Trademark Office English translation, (translated May 2014), 11 pages.*
Rehau, ABS Material Data Sheet (2013), 8 pages.*
European Search Report Corresponding to European Application No. 09 83 3751; dated Sep. 26, 2012; 5 Pages.

* cited by examiner

PIPE AND A METHOD FOR REDUCING BIOFILMS

RELATED APPLICATIONS

The present application is a 35 U.S.C. § 371 national phase application of PCT International Application Serial No. PCT/SE2009/051452, having an international filing date of Dec. 18, 2009, which claims priority to Swedish Application 0850161-1, filed Dec. 19, 2008, the disclosure of each of which is incorporated herein by reference in its entirety. PCT International Application No. PCT/SE2008/051533 was published in the English language and has International Publication No. WO 2010/071588.

FIELD OF INVENTION

The present invention relates generally to pipes for liquids, and especially to a pipe with improved design in order to reduce the occurrence of bacteria, microbes and other cell growths, so called biofilms, on the inside surface of the pipe. The invention further relates to a method for reducing the growth of such biofilms.

BACKGROUND

A problem with many pipes for liquids, i.e. pipes for distribution of liquids for human consumption, like water distribution pipes, is the occurrence of so called biofilms on the inside surface of the pipe. Due to bacteria, microbes and other cell growths occurs on the inside surface of the pipes. The same problem also occurs on the inside of sewage pipes reducing the flow in the pipe thus causing problems with stop ups and reduced capacity of the sewage system.

Despite reducing the flow capacity of the pipe, when such growths come loose from the surface of pipes distributing liquids for human consumption, people drinking the liquid might get problems such as diarrhea or the like due to bacteria.

Biofilms play an essential barrier role in conventional water treatment through the entrapment of particulate material as well as through nutrient removal. In distribution systems water practitioners have limited control over many of the processes that take place. Within these environments, distribution pipe biofilms can impact on the aesthetic (colour, taste and odour) quality of water and act as a reservoir of opportunistic microbial pathogens such as *legionellae, mycobacteria, pseudomonads, campylobacter*, enterohaemorrhagic *E. coli, helicobacter* and *salmonella* as well as model enteric virions have been shown to accumulate and persist in model systems, and may therefore present an additional source of concern.

Conventionally, disinfectants and microbials like chlorine has been used to reduce the growths of biofilms in pipes distributing liquids for human consumption, like water or other beverage. One of the disadvantages with chlorine is the formation of potentially hazardous disinfection by-products formed through the reaction of natural organic material with chlorine. Further, chlorine changes the taste and smell of the liquid.

In smaller systems for distributing beverage like milk or beer, often the whole system has to be separately cleaned with settled intervals to ensure proper quality of the beverage distributed. Such cleaning is not only costly and time consuming; it is also a risk that rests of cleaning chemicals remain in the system after cleaning, which could lead not only to bad taste of the beverage but also to a risk that unhealthy chemicals are consumed.

Similar problems with growth of biofilms also occurs in tubes for medical uses, like catheters for distributing liquid medicaments.

Attempts to avoid chemicals like chlorine and the like, and instead use electro-assisted methods have been done. In such known equipments, a coil is wound around a partial section of the pipe or duct to remove microbial biofilms. An electric signal is sent to the coil, thereby producing an electromagnetic field in the pipe. Although some effect might be seen, practical tests show that the effect of reducing growths of the biofilms, or removing the biofilms is poor. Further, such a solution with a wounded coil only produces an electromagnetic field in the immediate vicinity of the coil and is thus not applicable to pipes or ducts with a significant length.

SUMMARY OF THE INVENTION

An object of the present invention is to provide a pipe with an improved design reducing the growth of biofilms on the inside surface of the pipe, solving the problems mentioned above.

This object, among others, is according to the present invention attained by a pipe and a method, respectively, as defined by the appended claims.

According to the present invention, a pipe for transferring liquids comprising first and second parts of electrically conducting material is provided. The parts are extending substantially in the longitudinal direction of the pipe, and are electrically insulated from each other. Further, the parts are arranged on the inside surface of the pipe. By providing such a pipe with electrodes arranged on the inside surface of the pipe, growths of bacteria and biofilms can be reduced, and bacteria can be prevented from attaching to the surface or be forced/manipulated to detach.

In a preferred embodiment, the first and second parts of electrically conducting material form at least one pair of electrodes.

In a preferred embodiment, the first and second parts of electrically conducting material are imposed with an electrical potential, respectively.

In a preferred embodiment, the potential is a static potential.

In a preferred embodiment, the potential is an alternating potential.

In a preferred embodiment, the alternating potential is alternating between −1.5 and +1.5 V.

In a preferred embodiment, the pipe further comprises parts of electrically conducting material forming two or more pairs of electrodes.

In a preferred embodiment, the parts of electrically conducting material are arranged in direct contact with the liquid to be transferred.

In a preferred embodiment, the parts of electrically conducting material are arranged isolated from the liquid to be transferred.

In a preferred embodiment, the parts of electrically conducting material at least partly consist of semiconducting material.

In a preferred embodiment, the pipe is made of a thermoplastic material.

In a preferred embodiment, the pair of electrodes are imposed with said electrical potential via a plurality of coupling means arranged in intervals along said pipe.

The present invention further relates to a method for reducing the growths of biofilms on the inside surface of a pipe. The pipe is provided with first and second parts of electrically conducting material forming at least one pair of electrodes arranged on the inside surface of the pipe. A potential is applied on the at least one pair of electrodes.

In a preferred embodiment, the potential is applied via a plurality of coupling means arranged in intervals along the pipe.

In a preferred embodiment, the applied potential is a static potential.

In a preferred embodiment, the applied potential is an alternating potential.

Further features and advantages of the present invention will be evident from the following description.

BRIEF DESCRIPTION OF THE DRAWINGS

The present invention will become more fully understood from the detailed description of embodiments given below and the accompanying figures, which are given by way of illustration only, and thus, are not limitative of the present invention, wherein.

DETAILED DESCRIPTION OF EMBODIMENTS

In the following description, for purpose of explanation and not limitation, specific details are set forth, such as particular techniques and applications in order to provide a thorough understanding of the present invention. However, it will be apparent for a person skilled in the art that the present invention may be practiced in other embodiments that depart from these specific details. In other instances, detailed description of well-known methods and apparatuses are omitted so as not to obscure the description of the present invention with unnecessary details.

An embodiment of a pipe according to the present invention will now be described with reference to FIGS. 1-3.

Figure 1:
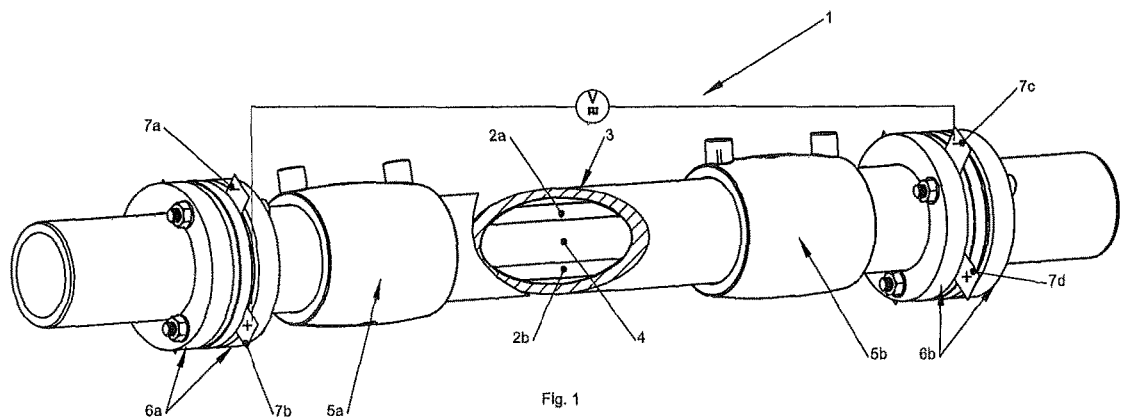
FIG. 1 is a perspective view of a pipe according to the present invention.

FIG. 1 shows a perspective view of a pipe 1 according to the present invention. The pipe 1 is provided with two parts 2a, 2b of electrically conducting material forming a pair of electrodes. The electrodes 2a, 2b are arranged on the inside surface 3 of the pipe 1, extending in the longitudinal direction of the pipe. A part of isolating material 4 is arranged between the two electrodes.

The pipe 1 is due to its length divided in parts joint together by electrofusion welding sockets 5a, 5b.

In connection to the joints flanges 6a, 6b with electrical connections 7a, 7b, 7c, 7d are provided.

The electrical connections 7a, 7b, 7c, 7d are on the inside of the pipe connected to the electrodes 2a, 2b. The other end of the electrical connections 7a, 7b, 7c, 7d are connected to a power supply source (not shown).

Such a described pipe with electrodes can preferably be manufactured by co-extrusion technology. A thermoplastic pipe can be provided with electrodes 2a, 2b in the form of stripes of electrically conducting plastic material in a conventional co-extrusion equipment.

Figure 2:
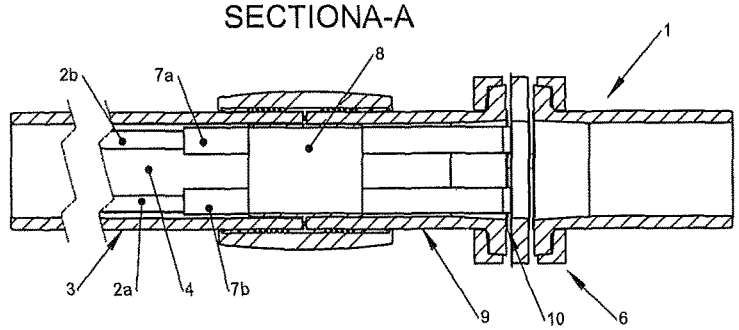
FIG. 2 is a cross-sectional view of a pipe according to the present invention.

FIG. 2 shows a cross-sectional view of a pipe according to the present invention. The pipe 1 is provided with a pair of electrodes 2a, 2b arranged on the inside surface 3 of the pipe 1 and extending in the longitudinal direction of the pipe. Two parts of the pipe 1 are joint together via electrofusion welding sockets 5a and 5b.

To create a liquid tight electrical connection, the present invention proposes the use of coupling means in the form of a flange coupling 6 with electrical connections 7. Two flanges 6a and 6b are provided with electrical connections 7a, 7b, 7c, 7d connecting the electrodes 2a, 2b to a supply source (not shown).

The electrical connections 7a, 7b, 7c, 7d of the arrangement are held into place by a supporting sleeve 8. The sleeve 8 is preferably made of a polymer material, e.g. polyamide, exhibiting swelling when in contact with water and water solutions. The swelling will increase contact pressure in the interface between the electrical connections 7a-d and the parts 2a and 2b to ensure electrical contact. The electrical connections are preferably stripes made of corrosion resistant material with a thickness around 0.2 mm.

The stub flange 9 is preferably made of an isolating polymer e.g. polyethylene, to ensure that no short circuit will occur. The stub flange 9 also enables transition of the electrical connections from the inside to the outside of the pipe 1.

Sealing gaskets 10 ensure that the transition is liquid tight. The gaskets need also be of electrically isolating material. The stub flange 9 and the sealing gaskets 10 are held into place by flanges 6a and 6b and are compressed with for example nuts and bolts to achieve a tight seal.

Figure 3:
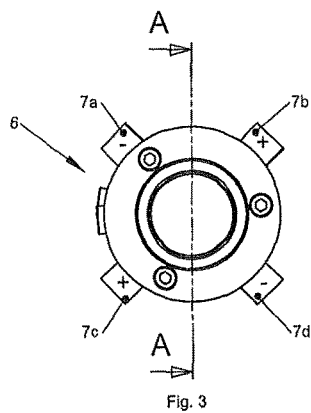
FIG. 3 shows a flange in use with the present invention.

FIG. 3 shows the flange 6 with electrical connections 7 in detail. The flange is provided with electrical connections 7a, 7b, 7c, 7d used for applying a potential to the pair of electrodes 2a, 2b.

The pipe will in use have the following functionality. An electrical potential is applied to the parts 2a, 2b of conductive material arranged on the inside surface 3 of the pipe 1. The parts 2a, 2b can be in the form of for example conductive stripes. The applied potential may be either alternating or static. Typically, adjacent conductive stripes will have reverse polarity, thus forming a pair of electrodes.

By applying electrical potential to the parts 2a, 2b a current or an electrical field through the liquid located inside the pipe is achieved, depending on whether the conductive material is in contact with the liquid or isolated from it.

If the conductive material is in direct contact with the liquid, a current is achieved. A preferred electrical potential in this case is low voltage like −1.5 to +1.5V. If the applied voltage is to high, hydrolysis will occur in a water based solution, splitting water into hydrogen $H_2$ and oxygen $O_2$.

If the conductive material instead is isolated from the liquid, an electrical field is achieved. In this case, the applied electrical potential can be much higher since no current flows in the liquid and thus no hydrolysis will occur.

Bacteria typically have a negative surface charge on their cell membrane thus causing the bacteria to move towards the positive pole due their charge. Bacteria located on a positively charged surface show an increased lateral movement associated with a weakening of the binding force between surface and bacteria. By increasing the shear rate in the liquid, i.e. by increasing the flow rate of the liquid, bacteria will detach easy due to the thus weakened binding forces.

The negative surface charge on the cell membrane of bacteria will cause bacteria to detach from negatively charged surfaces due to electro-repulsive forces.

Further, electrical currents and electrical fields will also have influence on the properties of the cell membrane. Channels may open in the membrane or the membrane will collapse.

Biofilms consisting of bacteria will behave in a similar manner under the influence of an electric current or an electrical field. The electrical current or field interact with charged particles in the biofilms matrix. This will result in breakdown and detachment of the whole matrix, or increased susceptibility of the bacteria due to channels formed in the matrix.

The method according to the present invention does not involve the use of added chemicals or drugs. The system can easily be scaled up for long distances of pipes, thus ideal for use with e.g. water distribution pipes and sewage systems. Further, the present invention is compatible with existing thermoplastic pipe systems in general, and polyethylene systems in particular, used worldwide.

Consequently, installers would be familiar with the installation and use of the system.

It will be obvious that the present invention may be varied in a plurality of ways. Such variations are not to be regarded as departure from the scope of the present invention as defined by the appended claims. All such variations as would be obvious for a person skilled in the art are intended to be included within the scope of the present invention as defined by the appended claims.

Itemized List of Embodiments

1. A pipe (1) for transferring liquids comprising first and second parts (2a, 2b) of electrically conducting material, said parts (2a, 2b) extending substantially in the longitudinal direction of said pipe (1), and said parts (2a, 2b) being electrically insulated from each other,
characterized in that
said parts (2a, 2b) are arranged on the inside surface (3) of said pipe (1).
2. Pipe according to item 1, wherein said first and second parts (2a, 2b) of electrically conducting material form at least one pair of electrodes.
3. Pipe according to item 1 or item 2, wherein said first and second parts (2a, 2b) of electrically conducting material are respectively imposed with an electrical potential.
4. Pipe according to item 3, wherein said potential is a static potential.
5. Pipe according to item 3, wherein said potential is an alternating potential.
6. Pipe according to item 5, wherein said alternating potential is alternating between −1.5 and +1.5 V.
7. Pipe according to any of items 2-6, comprising further parts of electrically conducting material forming two or more pairs of electrodes.
8. Pipe according to any of item 1-7, wherein said parts (2a, 2b) of electrically conducting material are arranged in direct contact with the liquid to be transferred.
9. Pipe according to any of items 1-7, wherein said parts (2a, 2b) of electrically conducting material are arranged isolated from the liquid to be transferred.
10. Pipe according to any items 1-9, wherein said parts (2a, 2b) of electrically conducting material at least partly consist of semiconducting material.
11. Pipe according to any of items 1-10, wherein said pipe is made of a thermoplastic material.
12. Pipe according to any of items 2-11, wherein said pair of electrodes are imposed with said electrical potential via a plurality of coupling means (6, 7) arranged in intervals along said pipe (1).
13. A method for reducing the growths of biofilms on the inside surface of a pipe, said pipe being provided with first and second parts (2a, 2b) of electrically conducting material arranged on the inside surface (3) of the pipe (1);
characterized by:
applying a potential on the said at least one pair of electrodes (2a, 2b).
14. Method according to item 13, wherein said potential is applied via a plurality of coupling means (6, 7) arranged in intervals along said pipe (1).
15. Method according to item 13 or 14, wherein said applied potential is a static potential.
16. Method according to item 13 or 14, wherein said applied potential is an alternating potential.

The invention claimed is:

1. A thermoplastic pipe for transferring liquids comprising:
a thermoplastic pipe body defining a longitudinal direction and having an inner surface; and
first and second parts of electrically conducting material in the form of electrodes, said parts extending in the longitudinal direction of said thermoplastic pipe body and being arranged on the inner surface of the thermoplastic pipe body, and said parts are stripes of electrically conducting plastic material and said parts are electrically insulated from each other, wherein said parts of electrically conducting material are configured to be isolated from a liquid to be transferred in the pipe body.
2. The thermoplastic pipe according to claim 1, wherein said first and second parts of electrically conducting material form at least one pair of electrodes.
3. The thermoplastic pipe according to claim 2, wherein the electrodes comprise two or more pairs of electrodes.
4. The thermoplastic pipe according to claim 1, further comprising an electrical connection configured to apply an electrical potential to said first and second parts of electrically conducting material, respectively.
5. The thermoplastic pipe according to claim 4, wherein said electrical potential is applied to said pair of electrodes via a plurality of electrical connections arranged in intervals along said pipe.
6. The thermoplastic pipe according to claim 1, further comprising an electrical connection configured to apply an electrical potential to said first and second parts of electrically conducting material, respectively, wherein said electrical potential is a static potential.
7. The thermoplastic pipe according to claim 1, further comprising an electrical connection configured to apply an electrical potential to said first and second parts of electrically conducting material, respectively, wherein said electrical potential is an alternating potential.
8. The thermoplastic pipe according to claim 1, further comprising an electrical connection configured to apply an electrical potential to said first and second parts of electrically conducting material, respectively, wherein said electrical potential is an alternating potential, and wherein said alternating potential is alternating between −1.5 and +1.5 V.
9. The thermoplastic pipe according to claim 1, wherein said parts of electrically conducting material comprise semiconducting material.
10. The thermoplastic pipe according to claim 1, wherein said pipe body is made of a thermoplastic material.
11. The thermoplastic pipe according to claim 1, wherein the thermoplastic pipe body comprises pipe parts joined together by electrofusion welding sockets.
12. A method for reducing the growths of biofilms on the inside surface of a thermoplastic pipe, the method comprising:
providing a thermoplastic pipe for transferring liquids, the thermoplastic pipe comprising:
a thermoplastic pipe body defining a longitudinal direction and having an inner surface; and
first and second parts of electrically conducting material in the form of electrodes, said parts extending in the longitudinal direction of said thermoplastic pipe body and being arranged on the inner surface of the thermoplastic pipe body, and said parts are stripes of electrically conducting plastic material and said parts are electrically insulated from each other, wherein said parts of electrically conducting material are configured to be isolated from a liquid to be transferred in the pipe body; and applying a potential to said first and second parts comprising stripes of electrically conducting plastic material that are electrically insulated from each other.

13. The method according to claim 12, wherein said potential is applied via a plurality of electrical connections arranged in intervals along said pipe.

14. The method according to claim 12, wherein said applied potential is a static potential.

15. The method according to claim 12, wherein said applied potential is an alternating potential.

16. The method according to claim 12, wherein the thermoplastic pipe body comprises pipe parts joined together by electrofusion welding sockets.

17. A thermoplastic pipe for transferring liquids comprising;

a thermoplastic pipe body defining a longitudinal direction and having an inner surface; and first and second electrodes arranged on the inner surface of the thermoplastic pipe body, said electrodes being stripes of electrically conducting plastic material, said electrodes being electrically insulated from each other, wherein said electrodes are configured to be isolated from a liquid to be transferred in the pipe body.

18. The thermoplastic pipe according to claim 17, wherein the thermoplastic pipe body comprises pipe parts joined together by electrofusion welding sockets.

* * * * *

UNITED STATES PATENT AND TRADEMARK OFFICE
CERTIFICATE OF CORRECTION

PATENT NO. : 10,132,439 B2
APPLICATION NO. : 13/140434
DATED : November 20, 2018
INVENTOR(S) : Andersson et al.

Page 1 of 1

It is certified that error appears in the above-identified patent and that said Letters Patent is hereby corrected as shown below:

On the Title Page

Item (30) Foreign Application Priority Data:
Please correct "0850161" to read -- 0850161-1 --

Signed and Sealed this
Twenty-sixth Day of March, 2019

Andrei Iancu
*Director of the United States Patent and Trademark Office*